United States Patent [19]

Wilmes et al.

[11] Patent Number: 5,852,106
[45] Date of Patent: Dec. 22, 1998

[54] COATING COMPOSITIONS FOR GLASS SUBSTRATES

[75] Inventors: Oswald Wilmes, Köln; Beate Baumbach, Leverkusen; Klaus Nachtkamp, Düsseldorf; Eberhard König, Leverkusen; Randall Dearth, Leverkusen; Manfred Bock, Leverkusen; Wolfhart Wieczorrek, Köln, all of Germany

[73] Assignee: Bayer Aktiengesellschaft, Leverkusen, Germany

[21] Appl. No.: 848,948

[22] Filed: May 1, 1997

[30] Foreign Application Priority Data

May 15, 1996 [DE] Germany ................. 196 19 545.4

[51] Int. Cl.$^6$ ................. C08J 3/00; C08K 3/20; C08L 75/00; B32B 27/00
[52] U.S. Cl. ............... 524/591; 428/423.1; 524/539; 524/839; 524/840
[58] Field of Search .................. 524/539, 591, 524/839, 840; 428/423.1

[56] References Cited

U.S. PATENT DOCUMENTS

| | | | |
|---|---|---|---|
| 4,280,944 | 7/1981 | Saito et al. | 260/29.2 TN |
| 4,403,085 | 9/1983 | Christenson et al. | 528/45 |
| 5,294,665 | 3/1994 | Pedain et al. | 524/591 |
| 5,326,601 | 7/1994 | Kawano et al. | 428/34.7 |
| 5,331,039 | 7/1994 | Blum et al. | 524/839 |
| 5,455,297 | 10/1995 | Pedain et al. | 524/591 |

FOREIGN PATENT DOCUMENTS

| | | |
|---|---|---|
| 025992 | 1/1981 | European Pat. Off. . |
| 025994 | 1/1981 | European Pat. Off. . |
| 324370 | 7/1989 | European Pat. Off. . |
| 469389 | 2/1992 | European Pat. Off. . |

*Primary Examiner*—Patrick D. Niland
*Attorney, Agent, or Firm*—Joseph C. Gil; Thomas W. Roy; Diderico van Eyl

[57] ABSTRACT

The present invention relates to aqueous polyurethane coating compositions wherein the binder contains a) a polyol component, which is soluble or dispersible in water and is the reaction product of a polyisocyanate component containing 50 to 100 wt. % of 4,4'-diisocyanatodicyclohexylmethane, a polyol component containing one or more polyether polyols and having an OH number of 25 to 350 mg KOH/g solids and an isocyanate-reactive component containing at least one group capable of salt formation and b) a polyisocyanate component, which is soluble or dispersible in water, has blocked isocyanate groups and is the reaction product of a polyisocyanate having an isocyanurate group content of 2 to 30 wt. %, a reversible, monofunctional blocking agent for isocyanate groups, a nonionic hydrophilic component and a stabilizing component which has 1 to 2 hydrazide groups and a molecular weight of 70 to 300, wherein the equivalent ratio of blocked isocyanate groups of component b) to hydroxyl groups of component a) is at least 0.8:1. The present invention also relates to the use of the binders for coating any glass surfaces, especially glass bottles.

3 Claims, No Drawings

COATING COMPOSITIONS FOR GLASS SUBSTRATES

BACKGROUND OF THE INVENTION

1. Field of the Invention

The present invention relates to aqueous polyurethane binders for coating compositions and to their use for coating glass, preferably glass bottles.

2. Description of the Prior Art

Glass surfaces may be provided with a coating for decorative or safety reasons (anti-shattering). In this way it is possible to increase the stability of a thin-walled glass bottle to such an extent that its stability matches that of a conventional commercial bottle. The lower weight of a coated light glass bottle is advantageous, in particular for deposit-paid bottles, and results in reduced transport costs. However, in addition to the anti-shattering effect, other severe requirements have to be fulfilled, such as abrasion resistance, elasticity, water resistance and alkali resistance.

The clear coating should not become turbid as a result of the frequent washing operations required for a returnable bottle and its mechanical properties should also not be degraded by the hot, alkaline washing fluid.

Solvent-free systems which may be applied as a single component are advantageous. EP-A 25,992 and EP-A 25,994 describe coating compositions containing polyester-based NCO prepolymers, which are crosslinked with pure melamine without solvents. However, the stoving temperature of above 180° C. and the only moderate resistance to alkaline washing detergents are disadvantageous.

EP-A 519,074 describes an aqueous glass coating composition that is applied in two coats, wherein the topcoat substantially contains three main components: a polyurethane dispersion, an aqueous epoxy resin and an aqueous melamine/ a formaldehyde resin.

The polyurethane dispersion used is a commercially available product of undisclosed composition, which achieves the required final properties only after the addition of substantial quantities of the other two resins. In contrast, the glass coating compositions according to the invention only require polyurethane structural units and may be applied as a single component.

U.S. Pat. No. 4,280,994 describes aqueous polyether-based polyurethane dispersions, which, by virtue of the free hydroxyl groups and blocked isocyanate groups contained therein, constitute a single component system, which can be thermally post-cured. However, good adhesion to glass and increased resistance to alkali also demand an increased crosslinking density, which can only be achieved with difficulty using the compositions described therein.

Relatively high crosslinking densities are achievable if OH-functional polyurethane dispersions are combined with aqueous, blocked polyisocyanate crosslinking agents. These systems, which contain two components, may be applied as a single component and crosslink under the action of heat. However, the examples of EP-A 566,953 and EP-A 576,952 only describe polyester-based compositions having moderate resistance to alkalies.

An object of the present invention is to provide coating compositions, which are suitable for glass surfaces, specifically for glass bottles, may be applied as a single component and have, in addition to outstanding optical properties, good adhesion, increased abrasion resistance, elasticity, water resistance and alkali resistance, in particular to hot, alkaline washing media.

This object may be obtained with the coating compositions according to the invention, which are described below in greater detail.

SUMMARY OF THE INVENTION

The present invention relates to aqueous polyurethane coating compositions wherein the binder contains a) a polyol component, which is soluble or dispersible in water and is the reaction product of
  A1) 20 to 60 wt. % of a polyisocyanate component containing 50 to 100 wt. % of 4,4'-diisocyanatodicyclohexylmethane and 0 to 50 wt. % of other organic polyisocyanates having a molecular weight of 140 to 1500,
  B1) 20 to 60 wt. % of a polyol component containing one or more polyether polyols and having an OH number of 25 to 350 mg KOH/g solids,
  C1) 2 to 12 wt. % of an anionic or potential anionic component containing one or more compounds having at least one isocyanate-reactive group and at least one group capable of salt formation, which may optionally be present in at least partially neutralized form,
  D1) 0 to 12 wt. % of a nonionic hydrophilic component containing one or more compounds which are mono- or difunctional for purposes of the isocyanate addition reaction and have at least one lateral or terminal hydrophilic polyether chain,
  E1) 0 to 15 wt. % of one or more polyhydric alcohols having 2 to 4 hydroxyl groups and a molecular weight of 62 to 250,
  F1) 0 to 15 wt. % of one or more (cyclo)aliphatic polyamines having 2 to 4 amino groups and a molecular weight of 60 to 300,
  G1) 0 to 30 wt. % of one or more (cyclo)aliphatic poly-amino/hydroxyl compounds having a total of 2 to 4 hydroxyl and amino groups and a molecular weight of 61 to 300 and
  H1) 0 to 15 wt. % of one or more stabilizing components which are mono- or difunctional for purposes of the isocyanate addition reaction and have 1 to 2 hydrazide groups and a molecular weight of 70 to 300,
wherein the percentages of A1) to H1) add up to 100 and b) a polyisocyanate component, which is soluble or dispersible in water, has blocked isocyanate groups and is the reaction product of
  A2) 40 to 80 wt. % of a polyisocyanate having an isocyanurate group content (calculated as $C_3N_3O_3$; molecular weight=126) of 2 to 30 wt. % and prepared from one or more diisocyanates having a molecular weight of 140 to 350 with
  B2) 5 to 30 wt. % of one or more reversible blocking agents for isocyanate groups which are monofunctional for purposes of the isocyanate addition reaction,
  C2) 0 to 15 wt. % of an anionic or potential anionic component containing one or more compounds having at least one isocyanate-reactive group and at least one group capable of salt formation, which may optionally be present in at least partially neutralized form,
  D2) 5 to 30 wt. % of a nonionic hydrophilic component containing one or more compounds which are mono- or difunctional for purposes of the isocyanate addition reaction and have at least one lateral or terminal hydrophilic polyether chain, E2) 0 to 15 wt. % of one or more polyhydric alcohols having 2 to 4 hydroxyl groups and a molecular weight of 62 to 250, F2) 0 to 15 wt. % of one or more (cyclo)aliphatic polyamines having 2 to 4 amino groups and a the molecular weight of 60 to 300 and G2) 0.5 to 15 wt. % of one or more stabilizing components which are mono- or difunctional for purposes of the isocyanate addition reaction and have 1 to 2 hydrazide groups and a molecular weight of 70 to 300, wherein the percentages of A2) to G2) add up to 100, provided that the equivalent ratio of blocked isocyanate groups of component b) to hydroxyl groups of component a) is at least 0.8:1.

The present invention also relates to the use of the binders for coating any glass surfaces, especially glass bottles.

DETAILED DESCRIPTION OF THE INVENTION

Binder component a) is selected from polyhydroxyl compounds containing urethane and ether groups, which are soluble or dispersible in water and have a number average molecular weight (which may be calculated from the hydroxyl group content and hydroxyl functionality) of 500 to 100,000, preferably of 1000 to 10,000. Suitable polyhydroxy compounds include those known from polyurethane coating chemistry, provided that the polyhydroxyl compounds contain sufficient hydrophilic groups, in particular polyether chains containing ethylene oxide units and/or carboxylate groups, to ensure their solubility or dispersibility in water. It is also possible to use blends of polyhydroxyl compounds which are not sufficiently hydrophilic for this purpose in admixture with external emulsifiers.

Starting component A1) is selected from organic polyisocyanates having a molecular weight of 140 to 1500, preferably 168 to 318, provided that 50 to 100, preferably 75 to 100 and more preferably 100 wt. % of component A1) is 4,4'-diisocyanatocyclohexylmethane (HMDI). In addition to HMDI, component A1) may also contain other polyisocyanates such as hexamethylene diisocyanate (HDI), 1-isocyanato-3,3,5-trimethyl-5-isocyanatomethyl-cyclohexane (IPDI), 2,4- and/or 2,6-diisocyanatotoluene (TDI), 1-methyl-2,4- and/or -2,6-diisocyanatocyclohexane and 4,4'-diisocyanatodiphenylmethane (MDI). Polyisocyanate component A1) may also contain known lacquer polyisocyanates based on HDI, IPDI and/or TDI, although this is less preferred.

Component B1) is selected from relatively high molecular weight polyhydroxy polyethers having a number average molecular weight (which may be calculated from the hydroxyl group content and hydroxyl functionality) of 300 to 5000, preferably 500 to 3000, which are known from polyurethane chemistry. Examples include polymers or copolymers of tetrahydrofuran, styrene oxide, propylene oxide, ethylene oxide, butylene oxides or epichlorohydrin, in particular of propylene oxide and optionally ethylene oxide, which are produced from difunctional starter molecules, such as water, ethylene glycol, 1,2-propanediol, 1,3-propanediol, diethylene glycol, 1,4-butanediol, 1,6-hexanediol, 1,8-octanediol, neopentyl glycol, 2-methyl- 1,3-propanediol, the bis-hydroxymethylcyclohexane isomers, 2,2-bis-(4-hydroxyphenyl)propane and amines containing two NH bonds. Ethylene oxide may optionally be used, provided that the resulting polyetherdiol contains at most 10 wt. % of ethylene oxide units. The polyetherdiols used are preferably those obtained without using ethylene oxide, more preferably those obtained from propylene oxide and/or tetrahydrofuran.

In addition to these relatively high molecular weight difunctional compounds, component B1) may also contain trifunctional or higher functional polyhydroxyl compounds, preferably polyetherpolyols, which are obtained from higher functional starting materials such as trimethylolpropane, glycerol or ethylenediamine.

It is also possible, although less preferred, to use polyether polyamines obtained by converting the hydroxyl groups of the previously described polyether polyols into primary amino groups.

Component C1) is selected from compounds containing anionic or potential anionic groups and having at least one isocyanate-reactive group. These compounds are preferably carboxylic acids containing at least one, preferably one or two hydroxyl or amino groups, or salts of these amino- or hydroxycarboxylic acids. Suitable acids include 2,2-bis (hydroxymethyl)alkane-carboxylic acids (such as dimethylolacetic acid, 2,2-dimethylolpropionic acid, 2,2-dimethylolbutyric acid or 2,2-dimethylol-pentanoic acid), dihydroxysuccinic acid, hydroxypivalic acid and mixtures of these acids. Dimethylolpropionic acid and/or hydroxypivalic acid are preferably used as component C1). It is also possible, although less preferred, to use sulphonate diols which may optionally contain ether groups as described in U.S. Pat. No. 4,108,814 (herein incorporated by reference) as anionic structural component C1).

The free acid groups, in particular carboxyl groups, are considered to be potential anionic groups, while the salt groups, in particular carboxylate groups, obtained by neutralization of the acids with bases are considered to be anionic groups.

Optional compounds D1) are selected from nonionic hydrophilic compounds containing one or two isocyanate-reactive groups, in particular hydroxyl or amino groups. At least 80 wt. % of the polyether chains present in these compounds are ethylene oxide units. Propylene oxide units may also be present. Suitable nonionic hydrophilic compounds include monofunctional polyethylene glycol monoalkyl ethers having number average molecular weights (which may be calculated from the hydroxyl group content and hydroxyl functionality) of 350 to 5000 such as Breox 350, 550 and 750 from BP Chemicals. Also suitable are the monofunctional compounds having one isocyanate-reactive group and hydrophilic chains containing ethylene oxide units as described, for example, in DE-A 2,651,506.

Diisocyanates and/or compounds containing two isocyanate-reactive groups, which also contain hydrophilic chains containing lateral ethylene oxide units, such as those described in DE-A 2,551,094, are also suitable for use as component D1).

Optional compounds E1) are selected from compounds having 2 to 4 hydroxyl groups and a molecular weight of 62 to 250. Examples include ethylene glycol, propylene glycol, 1,4-butanediol, 1,6-hexanediol, glycerol, trimethylolpropane, trimethylolethane, hexanetriol isomers and pentaerythritol.

Optional compounds F1) are selected compounds having 2 to 4 amino groups and a molecular weight of 60 to 300. Examples include ethylenediamine, 1,2- and 1,3-diaminopropane, 1,6-diaminohexane, 1,3-diamino-2,2-dimethyl-propane, isophoronediamine, 1,3- and 1,4-diamino-hexane, 4,4'-diaminodicyclohexylmethane, 2,4- and/or 2,6-diamino- 1 -methylcyclohexane, 4,4'-diamino-3, 3'-dimethyldicyclohexylmethane, 1,4-bis-(2-aminoprop-2- yl)cyclohexane, hydrazine, hydrazides and mixtures of diamines and/or hydrazines; higher functional polyamines such as diethylenetriamine, triethylenetetramine, dipropylenetriamine, tripropylene-tetramine and hydrogenated addition products of acrylonitrile onto aliphatic or cycloaliphatic diamines, preferably corresponding addition compounds of an acrylonitrile group onto a diamine, such as hexa-methylenepropylenetriamine, tetramethylenepropylenetriamine, isophoronepropylenetriamine, 1,4- or 1,3-cyclohexanepropylenetriamine and mixtures of these polyamines.

Optional compounds G1) are selected from compounds having a molecular weight of 60 to 300 and containing 2 to 4 amino groups and hydroxyl groups, such as ethanolamine, diethanolamine, triethanolamine and hydroxyethylethylenediamine.

Optional compounds H1) are selected from mono- and/or difunctional carboxylic acid hydrazides having a molecular weight of 70 to 300, such as adipic acid dihydrazide, benzoic acid hydrazide, p-hydroxybenzoic acid hydrazide, isomeric terephthalic acid hydrazides, N-2,2,6,6-tetramethyl-4-piperidinyl-N-aminooxamide (Luchem HA-R 100, Elf Atochem), 3-(4-hydroxy-3,5-di-t.-butylphenyl)propionic acid hydrazide, 2-hydroxy-3-t.-butyl-5-methylphenylacetic acid hydrazide or mixtures of these compounds. Other effective hydrazides are addition products prepared from cyclic carbonates and hydrazine as are described in EP-A 654,490 and EP-A 682,051. Examples include the addition products of 1 mole of hydrazine and 1 mole of propylene carbonate and 1 mole of hydrazine and 2 moles of propylene carbonate. Preferred stabilizers are adipic acid dihydrazide and N-2,2,6,6-tetramethyl-4-piperidinyl-N-aminooxamide.

The OH-functional polyether polyurethanes a) are produced in known manner from starting components A1) to H1) in one or more stages. The amounts of the reactants are selected such that the equivalent ratio of isocyanate groups of component A1) to isocyanate-reactive groups of components B1), C1), D1), E1), F1), G1) and H1) is 0.8:1 to 2:1, preferably 0.95:1 to 1.5:1 and more preferably 0.95:1 to 1.2:1.

Neither the carboxyl groups of component C1), the water used to prepare the solutions or dispersions of the polyurethanes nor the neutralizing agent used to neutralize the carboxyl groups are included in the calculation of the equivalent ratio.

Component E1) is preferably used in an amount of 0 to 75 wt. %, more preferably of 0 to 70 wt. %, based on the weight of component B1).

Component D1) is preferably used in an amount such that 0 to 30, preferably 0 to 20 wt. % of ethylene oxide units are incorporated within terminally and/or laterally arranged polyether chains present in the polyurethanes ultimately obtained according to the invention.

The quantity of component C1) and the degree of neutralization of the carboxyl groups incorporated with component C1) are calculated such that 0.1 to 120, preferably 1 to 80 milliequivalents of carboxyl groups are present per 100 g of solids in the ultimately obtained polyurethane, provided that the total quantity of ethylene oxide units and carboxylate groups is sufficient to ensure the solubility or dispersibility of the polyurethanes in water.

The nature and quantity ratios of starting components A1) to H1) are also calculated such that the resulting polyurethanes contain a maximum of 15, preferably a maximum of 10 wt. % of unreacted hydroxyl groups, based on resin solids.

Starting components A1) to H1) may be reacted in one or more stages. A solvent, which is inert towards isocyanate groups, may also be used such that the reaction products are obtained in the form of a solution in such a solvent. In this connection, "solution" means both a true solution and a water-in-oil emulsion, which may occur, for example, if some of the structural components are used in the form of aqueous solutions. Suitable solvents include acetone, methyl ethyl ketone, N-methylpyrrolidone and mixtures of these and/or other solvents. These solvents are preferably present in an amount sufficient to provide at least 10 wt. % solutions of the reaction products prepared from starting components A1) to H1).

The OH-functional polyether polyurethanes a) may be produced in the absence or presence of catalysts. Suitable catalysts are known and include those conventionally used in polyurethane chemistry. Examples include tertiary amines such as triethylamine; and tin compounds such as tin(II) octoate, dibutyltin oxide and dibutyltin dilaurate.

Suitable processes for the production of the polyurethane polyurea dispersions or solutions according to the invention are known and include those described in D. Dieterich in Houben-Weyl, *Methoden der organischen Chemie*, 4th edition, volume E 20, page 1659 (1987), for example, the prepolymer process or the acetone process.

Hydroxyl groups may be introduced by reacting an NCO prepolymer with excess E1) or G1). If the process is performed in a solvent, these components may be added to the prepolymer. In a solvent-free melt process, in which at most small quantities of co-solvents are used, the components may be added to the prepolymer only if OH-functional structural units are used. When components containing amino groups are used, they should be slowly added into the dispersion water or a proportion of the dispersion water, optionally in the presence of a co-solvent, in order to keep the exothermic reaction under control.

The base necessary for at least partially neutralizing the carboxyl groups may be added before, during or after the addition of water.

Suitable bases include ammonia, N-methylmorpholine, dimethyl-isopropanolamine, triethylamine, dimethylethanolamine, methyldiethanol-amine, triethanolamine, morpholine, tripropylamine, ethanolamine, triisopropanolamine, 2-diethylamino-2-methyl-1-propanol and mixtures of these and/or other neutralizing agents. Sodium hydroxide, lithium hydroxide and potassium hydroxide are also suitable, although less preferred, as neutralizing agents. Ammonia and dimethylethanolamine are preferred neutralizing agents.

The amount of water used is selected such that the resulting solutions or dispersions have a solids content of 10 to 60, preferably 20 to 45 wt. %. Once the water has been added, any co-solvent may optionally be removed by distillation. The polyurethanes according to the invention are ultimately obtained in the form of aqueous solutions or aqueous dispersions. Whether aqueous solutions or dispersions are obtained is primarily determined by the concentration of the hydrophilic segments.

It is possible in the process according to the invention to use larger quantities of tri- and polyfunctional structural components, in particular crosslinking components E1), F1) and/or G1), such that the polyurethanes obtained are highly branched instead of having a substantially linear structure. The aqueous solutions and dispersions a) are resistant to frost, stable in storage and may be infinitely diluted with water.

Crosslinking component b) is selected from blocked polyisocyanates which are soluble or dispersible in water and have a blocked isocyanate group content (calculated as NCO, molecular weight=42) of 5 to 11 wt. %.

Starting component A2) is selected from organic polyisocyanates having an isocyanurate group content (calculated as $C_3N_3O_3$, molecular weight=126) of 2 to 30 wt. %, preferably of at least 5 wt. %, and prepared from diisocyanates having a molecular weight of 140 to 350. Diisocyanates which may be used include 4,4'-diisocyanatodicyclohexyl-methane (Desmodur W, Bayer AG), 1-isocyanato-3,3,5-trimethyl-5-isocyanatomethylcyclohexane (IPDI), 1,6-diisocyanatohexane (HDI) and mixtures of these polyisocyanates. Polyisocyanate component A2) is prepared from the diisocyanates using known methods, e.g., those described in Laas, H.-J. et al. in *J. prakt. Chem.* 336 (1994) and EP-A 649,866.

Oximes and/or pyrazoles are preferably used as the monofunctional blocking agents B2). More preferred blocking agents are butanone oxime and/or 3,5-dimethylpyrazole.

Component C2) is selected from compound containing anionic or potential anionic groups and having at least one isocyanate-reactive group. These compounds are preferably carboxylic acids containing at least one, preferably one or two hydroxyl groups, or salts of these hydroxycarboxylic acids. Suitable acids include 2,2-bis(hydroxymethyl)-alkanecarboxylic acids (such as dimethylolacetic acid, 2,2-dimethylol-propionic acid, 2,2-dimethylolbutyric acid or 2,2-dimethylolpentanoic acid), dihydroxysuccinic acid, hydroxypivalic acid and mixtures of these acids. Dimethylolpropionic acid and/or hydroxypivalic acid are preferably used as component C2).

The free acid groups, in particular carboxyl groups, are considered to be potential anionic groups, while the salt groups, in particular carboxylate groups, obtained by neutralization of the acids with bases are considered to be anionic groups.

Optional compounds D2) are selected from nonionic hydrophilic compounds containing one or two isocyanate-reactive groups, in particular hydroxyl or amino groups. At least 80 wt. %, preferably 100 wt. %, of the polyether chains present in these compounds are ethylene oxide units. Propylene oxide units may also be present. Suitable nonionic hydrophilic compounds include monofunctional polyethylene glycol monoalkyl ethers having number average molecular weights (which may be calculated from the hydroxyl group content and hydroxyl functionality) of 350 to 5000, preferably 600 to 900, such as Breox 350, 550 and 750 from BP Chemicals.

Optional compounds E2) are selected from compounds having 2 to 4 hydroxyl groups and a molecular weight of 62 to 250. Examples include ethylene glycol, propylene glycol, 1,4-butanediol, 1,6-hexanediol, glycerol, trimethylolpropane, trimethylolethane, hexanetriol isomers, pentaerythritol and mixtures of these compounds.

Optional compounds F2) are selected compounds having 2 to 4 amino groups and a molecular weight of 60 to 300. Examples include ethylenediamine, 1,2- and 1,3-diaminopropane, 1,6-diaminohexane, 1,3-diamino-2,2-dimethylpropane, 1-amino-3,3,5-trimethyl-5-aminomethylcyclohexane (IPDA), 1,3- and 1,4-diaminohexane, 4,4'-diaminodicyclohexylmethane, 2,4- and 2,6-diamino-1-methylcyclohexane, 4,4'-diamino-3,3'-dimethyldicyclohexylmethane, 1,4-bis-(2-aminoprop-2-yl)cyclohexane and mixtures of these compounds.

Component G2) is selected from mono- and/or difunctional carboxylic acid hydrazides having a molecular weight of 70 to 300. Examples include adipic acid dihydrazide, benzoic acid hydrazide, p-hydroxybenzoic acid hydrazide, isomeric terephthalic acid hydrazides, N-2,2,6,6-tetramethyl-4-piperidinyl-N-aminooxamide (Luchem HA-R 100, Elf Atochem), 3-(4-hydroxy-3,5-di-t.-butylphenyl) propionic acid hydrazide, 2-hydroxy-3-t.-butyl-5-methylphenylacetic acid hydrazide and mixtures of these compounds. Other effective hydrazides are addition products prepared from cyclic carbonates and hydrazine, for example from 1 mole of hydrazine and 1 or two moles of propylene carbonate, as described in EP-A 654,490 and EP-A 682,051. Preferred stabilizers are adipic acid hydrazide and N-2,2,6,6-tetramethyl-4-piperidinyl-N-aminooxamide.

Blocked polyisocyanate component b) is produced from starting components A2) to G2) in multiple stages. The amounts of the reactants are selected such that the equivalent ratio of isocyanate groups of component A2) to isocyanate-reactive groups of components B2), C2), D2), E2), F2) and G2) is 1:0.8 to 1:1.2, preferably 1:09 to 1:1. Neither the carboxyl groups of component C2), the water used to prepare the solutions or dispersions of the polyurethanes nor the neutralizing agent used to neutralize the carboxyl groups are included in the calculation of this equivalent ratio.

Component D2) is used in a quantity such that preferably 0.1 to 10, more preferably 0.5 to 3 wt. % of ethylene oxide units (calculated as $C_2H_4O$, molecular weight=44) are incorporated within terminal and/or lateral polyether chains in the blocked polyisocyanates b) according to the invention.

The quantity of component C2) is calculated such that preferably 0.1 to 1.5, more preferably 0.5 to 0.7 wt. % of chemically incorporated carboxyl groups (calculated as COOH, molecular weight=45) are present in blocked polyisocyanate b), provided that the total quantity of ethylene oxide units and carboxylate groups is sufficient to ensure the solubility or dispersibility of the blocked polyisocyanates in water.

Component G2) is present in an amount such that preferably 0.1 to 3.0, more preferably 0.1 to 1.0 wt. %, of chemically incorporated hydrazide groups (calculated as HN-NH, molecular weight=30) are present in blocked polyisocyanates b).

In the first stage of the production process, hydrophilic components C2) and D2) are introduced into a vessel and reacted with polyisocyanate component A2) at a temperature of 80° to 100° C., preferably at 90° C., until the hydrophilic components are incorporated into the polyisocyanate. The reaction mixture is then cooled to 70° C. and blocking agent B2) is incrementally added and reacted until the theoretically calculated NCO value is obtained. The temperature should not exceed 80° C. during the reaction.

Chain extenders E2) and F2) and stabilizing component G2) may be incorporated before or during the dispersion operation. Components E2), F2) and G2) are preferably dissolved in water and the reaction mixture is dispersed in this solution with thorough stirring. The amount of water used is selected such that the resulting solutions or dispersions have a solids content of 20 to 50 wt. %, preferably 30 to 40%.

The base necessary for at least partially neutralizing the carboxyl groups may be added before, during or after the dispersion stage. Suitable bases include ammonia, N-methylmorpholine, dimethylisopropanolamine, triethylamine, dimethylethanolamine, methyldiethanolamine, triethanolamine, morpholine, tripropylamine, ethanol, triisopropanolamine, 2-diethylamino-2-methyl-1-propanol and mixtures of these and/or other neutralizing agents. Sodium hydroxide, lithium hydroxide and potassium hydroxide are also suitable, although less preferred, as neutralizing agents. Dimethylethanolamine is the preferred neutralizing agent.

The coating compositions according to the invention are produced by blending polyol component a), which is soluble or dispersible in water, with the blocked polyisocyanate component b), which is soluble or dispersible in water, in known manner. It is possible to mix aqueous dispersions of components a) and b) or to mix components a) and b) in anhydrous form and then to disperse them together.

In the following examples all parts and percentages are weight percentages, unless otherwise indicated.

EXAMPLES

Example 1

Production of an aqueous polyol component according to the invention 200 parts of a propylene oxide polyether started on propanediol and having an OH number of 112 were mixed with 40.2 parts of 2,2-dimethylolpropionic acid, combined at 60° C. with 301.3 parts of 4,4'-diisocyanatodicyclohexylmethane (Desmodur W, Bayer AG) and reacted at 90° C. until the NCO content of the resulting NCO prepolymer had fallen to 10.1%. 13.4 parts of trimethylolpropane and 165.6 parts of acetone were added at 90° C., which cooled the reaction mixture to approximately 70° C. The mixture was stirred at reflux temperature until the NCO content had fallen to 5.5%. The prepolymer was then dissolved in 203.6 parts of acetone.

A solution of 79.3 parts of diethanolamine and 9.8 parts of hydroxyethylethylenediamine in 248.0 parts of demineralized water was added dropwise at 50° C. over 20 minutes. 20.0 parts of N,N-dimethyl-ethanolamine were then added, stirred for 2 minutes and dispersed with 1174 parts of demineralized water within 20 minutes. The acetone was then removed by vacuum distillation. Once an acetone content of <1% was reached, the dispersion was adjusted to a solids content of 32%.

Example 2

Production of an aqueous blocked polyisocyanate according to the invention

Formulation 486.67 g (1.00 equiv) of a lacquer polyisocyanate containing allophanate and isocyanurate groups and based on 4,4'-diisocyanatodicyclohexylmethane (Desmodur W, Bayer AG), produced in accordance with the process described in EP-A 649 866, present as a 70% solution in methoxypropyl acetate/xylene (1:1): For the preparation of the Desmodur W-allophanate/trimer the same procedure is followed as described in EP-A 649 866. The catalyst used is a 4.4% by weight solution of N,N,N-trimethyl-N-benzylammonium hydroxide in n-butanol (the catalyst solution of Example 1 of EP-A 649 866).

33 g of n-butanol are added to 1167 g of Desmodur W and the mixture is stirred for 1 hour at 90° C. When urethanisation is complete, approx. 4 g of the catalyst solution is added at 90° C. When the NCO content of the reaction mixture has reached 25.6%, the reaction is terminated by adding 0.3 g of a 25% solution of dibutyl phosphate in Desmodur W. Any excess of monomeric Desmodur W is removed by thin-layer distillation. The isolated solid resin is dissolved in MPA/xylene (1:1) to a concentration of 70% and a product with the following characteristic data is obtained:

solids content: 70%
NCO content: 8.63%
viscosity: 300 mPas (23° C.)
monomeric Desmodur W: 0.20%

75.00 g (0.10 equiv) of a monofunctional polyethylene glycol monomethyl ether (monohydroxy polyether) having an average molecular weight of 750 (Carbowax 750, Union Carbide)

69.70 g (0.80 equiv) of butanone oxime 2.55 g (0.03 equiv) of isophorone diamine (IPDA)

2.61 g (0.03 equiv) of adipic acid dihydrazide (ASDH)

764.80 g of deionized water

Method 75.00 g of the monohydroxy polyether were introduced into a standard stirrer apparatus and heated to 90° C. 486.67 g of the lacquer polyisocyanate were rapidly stirred in. An NCO content of 6.28% was reached within approximately 30 minutes (theoretical NCO content: 6.73%). The reaction mixture was then cooled to 70° C. And 69.70 g of butanone oxime were added within approximately 30 minutes in such a manner that a temperature of 80° C. was not exceeded due to the exothermic reaction. When an NCO content of 0.25% was reached (theoretical NCO content: 0.66%), the reaction mixture was cooled to 70° C. and dispersed within approximately 30 minutes with thorough stirring into a solution of 2.55 g of IPDA and 2.61 g of ASH in 764.80 g of deionized water (approximately 23° C.). A milky dispersion having a solids content of 35% and a draining time of 14 seconds (DIN 4/23° C.) was obtained. The NCO equivalent weight of the dispersion (based on the blocked isocyanate groups) was 1750.00 g. The blocked polyisocyanate had the following properties:

Isocyanurate group content: 4.86% (calculated as $C_3N_3O_3$; molecular weight=126)

Blocked isocyanate group content: 6.85% (calculated as NCO; molecular weight=42)

Hydrazide group content: 0.18% (calculated as HN-NH; molecular weight=30)

486.67 parts (1.00 equiv) of a lacquer polyisocyanate based on 4,4'-diisocyanatodicyclohexylmethane, produced according to EP-A 649 866 as a 70% solution in methoxypropyl acetate/xylene (1:1) and having an NCO content (based on solution) of 8.63% and a viscosity (based on solution) at 23° C. Of approximately 300 mPa.s 75.00 parts (0.10 equiv) of a monofunctional polyethylene oxide alcohol having an average molecular weight of 750 (Carbowax 750, Union Carbide)

69.70 parts (0.80 equiv) of butanone oxime 2.55 parts (0.03 equiv) of 1-amino-3,3,5-trimethyl-5-aminomethyl cyclohexane (IPDA)

2.61 parts (0.03 equiv) of adipic acid dihydrazide (ASDH)

764.80 parts of deionized water

Method 75.00 parts of the monofunctional alcohol were introduced into a standard stirred apparatus and heated to 90° C. 486.67 parts of the lacquer polyisocyanate were rapidly stirred in. Stirring was continued at 90° C. Until an NCO content of 6.28% was obtained. The reaction mixture was then cooled to 70° C. And 69.70 parts of butanone oxime were added within 30 minutes in such a manner that a temperature of 80° C. was not exceeded. Once an NCO content of 0.25% was obtained, the reaction mixture was cooled to 70° C. and dispersed within 30 minutes into a solution of 2.55 parts of IPDA and 2.61 parts of ASDH in 764.80 parts of deionized water with thorough stirring. A milky dispersion was obtained having a solids content of 35%, a blocked NCO content of 2.40% and a draining time of 14 s (DIN 4/23° C.).

Example 3

Production of the coating composition according to the invention 1265 parts of the polyol component from Example 1 were mixed with 1750 parts of the crosslinking component from Example 2. 376 parts of demineralized water, 32.4 parts of a leveling agent (Fluoride FC 170, 3M) and 168.8 parts of dipropylene glycol were added and the components were stirred until a homogeneous mixture was obtained.

A wet film having a thickness of 130 to 150 µm was applied by compressed air spraying (air pressure 4 to 5 bar) onto a glass sheet rinsed with hot water and then thoroughly dried. The film was pre dried at 120° C. For 7 minutes and then stoved for 30 minutes at 140° C.

A clear, non-yellowed coating having very good leveling and very good optical properties was obtained.

Test results

Pendulum hardness (determined to DIN 53 157): 175 s

Tensile strength (determined to DIN 53 455): 33.4 N/mm

Abrasion (Tabor) (determined to ASTM D 4060): 30 mg

Solvent Resistance (determined by placing a saturated cotton wool swab on the coating for 5 minutes. Rating scale: 0-unchanged to 5-destroyed)

Xylene: 0 unchanged, no result

1-Methoxy-2-propyl acetate: 0 unchanged, no result

Ethyl acetate: 0 unchanged, no result

Acetone: 1 slight change (only visible change)

Adhesion after exposure to a 4% NaOH solution for 1 hour at 80° C.: No change was discernible on the cross-hatched area. QUA sodium hydroxide solution test (determined to ASTM G 5377):

The coated glass sheet was exposed to 275 nm UV radiation at 50° C. For 9 hours, then to a condensing atmosphere for 3 hours at 45° C. The glass sheet was then rinsed with water, immersed for 10 minutes at 80° C. In a 2% NaOH solution and cooled to 50° C. This operation was repeated until the coating was destroyed. The coating tested was unchanged after 14 days of this test.

Elongation (determined to DIN 53 455) 5.8%

Over stoving resistance

When stoved for 30 minutes at 170° C., the properties of the coating remained unchanged, no yellowing occurred.

Anti-shattering:

Anti-shattering action was deemed satisfactory if the coating held the shattered test specimen together after being dropped from a height of 1 m onto a concrete surface.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous polyurethane coating composition wherein the binder comprises
a) a polyol component, which is soluble or dispersible in water and is the reaction product of
A1) 20 to 60 wt. % of a polyisocyanate component containing 50 to 100 wt. % of 4,4'-diisocyanatodicyclohexylmethane and 0 to 50 wt. % of other organic polyisocyanates having a molecular weight of 140 to 1500,
B1) 20 to 60 wt. % of a polyol component containing one or more polyether polyols and having an OH number of 25 to 350 mg KOH/g solids,
C1) 2 to 12 wt. % of an anionic or potential anionic component containing one or more compounds having at least one isocyanate-reactive group and at least one group capable of salt formation, which may optionally be present in at least partially neutralized form,
D1) 0 to 12 wt. % of a nonionic hydrophilic component containing one or more compounds which are mono- or difunctional for purposes of the isocyanate addition reaction and have at least one lateral or terminal hydrophilic polyether chain,
E1) 0 to 15 wt. % of one or more polyhydric alcohols having 2 to 4 hydroxyl groups and a molecular weight of 62 to 250,
F1) 0 to 15 wt. % of one or more (cyclo)aliphatic polyamines having 2 to 4 amino groups and a molecular weight of 60 to 300,
G1) 0 to 30 wt. % of one or more (cyclo)aliphatic polyamino/hydroxyl compounds having a total of 2 to 4 hydroxyl and amino groups and a molecular weight of 61 to 300 and
H1) 0 to 15 wt. % of one or more stabilizing components which are mono- or difunctional for purposes of the isocyanate addition reaction and have 1 to 2 hydrazide groups and a molecular weight of 70 to 300, wherein the percentages of A1) to H1) add up to 100 and
b) a polyisocyanate component, which is soluble or dispersible in water, has blocked isocyanate groups and is the reaction product of
A2) 40 to 80 wt. % of a polyisocyanate having an isocyanurate group content (calculated as $C_3N_3O_3$; molecular weight=126) of 2 to 30 wt. % and prepared from one or more diisocyanates having a molecular weight of 140 to 350 with
B2) 5 to 30 wt. % of one or more reversible blocking agents for isocyanate groups which are monofunctional for purposes of the isocyanate addition reaction,
C2) 0 to 15 wt. % of an anionic or potential anionic component containing one or more compounds having at least one isocyanate-reactive group and at least one group capable of salt formation, which may optionally be present in at least partially neutralized form,
D2) 5 to 30 wt. % of a nonionic hydrophilic component containing one or more compounds which are mono- or difunctional for purposes of the isocyanate addition reaction and have at least one lateral or terminal hydrophilic polyether chain,
E2) 0 to 15 wt. % of one or more polyhydric alcohols having 2 to 4 hydroxyl groups and a molecular weight of 62 to 250,
F2) 0 to 15 wt. % of one or more (cyclo)aliphatic polyamines having 2 to 4 amino groups and a the molecular weight of 60 to 300 and G2) 0.5 to 15 wt. % of one or more stabilizing components which are mono- or difunctional for purposes of the isocyanate addition reaction and have 1 to 2 hydrazide groups and a molecular weight of 70 to 300, wherein the percentages of A2) to G2) add up to 100, provided that the equivalent ratio of blocked isocyanate groups of component b) to hydroxyl groups of component a) is at least 0.8:1.

2. A glass substrate coated with the coating composition of claim 1.

3. A glass bottle coated with the coating composition of claim 1.

* * * * *